(12) United States Patent
Gallucci et al.

(10) Patent No.: US 11,395,988 B2
(45) Date of Patent: Jul. 26, 2022

(54) ADVANCED DOUBLE SKIN MEMBRANES FOR MEMBRANE REACTORS

(71) Applicant: HYDROGEN ONSITE, S.L., Edificio (ES)

(72) Inventors: Fausto Gallucci, Heeze (NL); Alba Arratibel, San Sebastian (ES); Martin van Sint Annaland, Budel (NL); David Alfredo Pacheco Tanaka, Puna State (PE); Ekain Fernandez Gesalaga, Zarautz (ES); Iker Laso Peña, Astigarraga (ES)

(73) Assignee: HYDROGEN ONSITE, S.L., Edificio (ES)

( * ) Notice: Subject to any disclaimer, the term of this patent is extended or adjusted under 35 U.S.C. 154(b) by 509 days.

(21) Appl. No.: 16/467,579

(22) PCT Filed: Dec. 7, 2017

(86) PCT No.: PCT/EP2017/081835
§ 371 (c)(1),
(2) Date: Jun. 7, 2019

(87) PCT Pub. No.: WO2018/104455
PCT Pub. Date: Jun. 14, 2018

(65) Prior Publication Data
US 2020/0391154 A1    Dec. 17, 2020

Related U.S. Application Data

(60) Provisional application No. 62/431,733, filed on Dec. 8, 2016.

(51) Int. Cl.
| | | |
|---|---|---|
| B01D 53/22 | (2006.01) | |
| B01D 71/02 | (2006.01) | |
| B01J 23/42 | (2006.01) | |
| B01J 23/44 | (2006.01) | |
| B01J 23/46 | (2006.01) | |
| B01J 23/755 | (2006.01) | |
| C01B 3/50 | (2006.01) | |

(52) U.S. Cl.
CPC ......... B01D 53/228 (2013.01); B01D 71/022 (2013.01); B01D 71/025 (2013.01);
(Continued)

(58) Field of Classification Search
None
See application file for complete search history.

(56) References Cited

U.S. PATENT DOCUMENTS

| | | |
|---|---|---|
| 6,541,676 B1 | 4/2003 | Franz et al. |
| 2008/0163753 A1 * | 7/2008 | Bossard ............. B01D 53/22 95/55 |

(Continued)

FOREIGN PATENT DOCUMENTS

| | | | |
|---|---|---|---|
| JP | 2006095521 | 4/2006 | |
| KR | 1020140117056 | * 10/2014 | ........... B01D 53/228 |

OTHER PUBLICATIONS

Tanaka, David A Pacheco et al., "Preparation of "pore-fill" type Pd—YSZ—y—Al2O3 composite membrane supported on a-Al2O3 tube for hydrogen separation", Journal of Membrane Science, 320, 2008, pp. 436-441. (Year: 2008).*

(Continued)

*Primary Examiner* — Jason M Greene

(57) ABSTRACT

A hydrogen permeable membrane device is provided that includes a porous ceramic layer having a material that includes zirconia, Yttria-stabilized zirconia (YSZ), $\gamma/Al_2O_3$, and/or YSZ— $\gamma/Al_2O_3$, and a porous Pd film or porous Pd-alloy film deposited on the a mesoporous ceramic layer.

14 Claims, 14 Drawing Sheets

(52) U.S. Cl.
CPC ............... *B01J 23/42* (2013.01); *B01J 23/44* (2013.01); *B01J 23/462* (2013.01); *B01J 23/464* (2013.01); *B01J 23/755* (2013.01); *C01B 3/505* (2013.01); *B01D 2256/16* (2013.01); *B01D 2325/04* (2013.01); *B01D 2325/10* (2013.01); *C01B 2203/0266* (2013.01)

(56) References Cited

U.S. PATENT DOCUMENTS

2008/0176060 A1* 7/2008 Harold ................. B01D 71/022
428/316.6
2012/0325087 A1* 12/2012 Tsai ......................... C01B 3/505
95/56

OTHER PUBLICATIONS

English language translation for KR 1020140117056. Retrieved from translationportal.epo.org on Nov. 9, 2021. (Year: 2021).*

Tanaka et al. Preparation of "pore-fill" type Pd—YSZ—γ—Al2O3 composite membrane supported on α-Al2O3 tube for hydrogen separation. J. Membrane Science 320 436-441.

Tanaka et al. Fabrication of Hydrogen-Permeable Composite Membranes Packes with Palladium Nanoparticles. Adv. Materials 18 630-632.

Yu et al. Synthesis of a zeolite membrane as a protective layer on a metallic Pd composite membrane for hydrogen purification. J .Mater. Chem. 3(9) 5000-5006.

* cited by examiner

Table 2. Permeation properties of Pd-based supported membranes reported in the literature.

| Selective layer/ support | Preparation method | Thickness (μm) | Temp. (°C) | Pressure difference (kPa) | $H_2$ Flux (mol m$^{-2}$ s$^{-1}$) | $H_2$ permeance ($10^{-6}$ mol m$^{-2}$ s$^{-1}$ Pa$^{-1}$) | $H_2/N_2$ | Ea (kJmol$^{-1}$) | n | Ref. |
|---|---|---|---|---|---|---|---|---|---|---|
| Metallic porous support | | | | | | | | | | |
| Pd$_{77}$Ag$_{23}$/PSS | PVD-MS$^a$ | >2 | 350 | 500 | 1.5 | 3.0 | 500 | - | - | [17] |
| Pd$_{77}$Ag$_{23}$/microchannel | PVD-MS$^a$ | 1.4 | 300 | 80 | 1.8 | 22.5 | 5700 | - | - | [14] |
| Pd$_{77}$Ag$_{23}$/PSS | PVD-MS$^a$ | 1.9-3.8 | 400 | 100 | 1.49 | 14.9 | ≈7700 | - | 0.631 | [15] |
| Ceramic porous support | | | | | | | | | | |
| Pd$_{91}$Ag$_9$/Al$_2$O$_3$ | ELP | 0.46 | 400 | 100 | 1.57 | 15.7 | 48 | 5.47 | 0.81 | [10] |
| Pd$_{95}$Cu$_5$/ZrO$_2$-Al$_2$O$_3$ | ELP | 1.3 | 365 | 145 | 0.718 | 4.95 | 127 | - | 0.553 | [9] |
| Pd$_{77}$Ag$_{23}$/YSZ-Al$_2$O$_3$(HF) | S-ELP$^b$ | 0.4 | 450 | 100 | 0.87 | 8.7 | 416 | 8.76 | 1.09 | [18] |
| PdAg/ZrO$_2$ | PVD-ELP | 0.7-0.8 | 400 | 100 | 0.8 | 8.0 | 500 | - | 0.5 | [19] |
| Pd$_{91}$Ag$_9$/Al$_2$O$_3$ | ELP | 0.78 | 400 | 100 | 1.06 | 10.6 | 636 | 6.60 | 0.67 | [10] |
| Pd$_{90}$Ag$_{10}$/Al$_2$O$_3$[20][16][19] | ELP | 2.1 | 400 | 400 | 1.00 | 2.5 | >1000 | 5.77 | 0.5 | [20] |
| Pd$_{80}$Ag$_{20}$/Al$_2$O$_3$ | ELP | 2.2 | 400 | 400 | 1.64 | 4.1 | >1000 | 2.93 | 0.5 | [20] |
| Pd$_{77}$Ag$_{23}$/YSZ-Al$_2$O$_3$(HF) | S-ELP$^b$ | 0.8 | 450 | 100 | 0.8 | 8.0 | 1212 | 14.2 | 1.09 | [18] |
| Pd$_{92.8}$Ag$_{7.2}$/Al$_2$O$_3$ | ELP | 1.17 | 400 | 100 | 0.92 | 9.2 | 1270 | 7.81 | 0.62 | [10] |
| Pd$_{77}$Ag$_{23}$/YSZ-Al$_2$O$_3$(HF) | S-ELP$^b$ | 1.2 | 450 | 100 | 0.57 | 5.7 | 1583 | 13.64 | 1.09 | [18] |
| Pd/YSZ-Al$_2$O$_3$(HF) | ELP | 1.2 | 450 | 100 | 0.39 | 3.9 | 2600 | 20.48 | 1.09 | [18] |
| Pd/α-Al$_2$O$_3$(HF) | ELP | 1.5 | 450 | 100 | 0.237 | 2.37 | 3115 | 13.3 | 1 | [21] |
| Pd$_{94.3}$Ag$_{5.7}$/Al$_2$O$_3$ | ELP | 1.29 | 400 | 100 | 0.92 | 9.2 | 3500 | 7.67 | 0.64 | [21] |
| Pd/Al$_2$O$_3$(HF) | ELP | 0.9 | 460 | 105 | 0.42 | 4.0 | 9200 | 15.0 | 1 | [10] |
| Pd$_{80}$Ag$_{20}$/Al$_2$O$_3$ | ELP | 2.5 | 400 | 100 | 0.51 | 5.1 | >10000 | 17.8 | 0.5 | [22] |
| Pd$_{80}$Ag$_{20}$/Al$_2$O$_3$ | ELP | 2.5 | 400 | 100 | 0.34 | 3.4 | >10000 | 17 | 0.5 | [22] |
| Pd$_{95}$Ag$_5$/Al$_2$O$_3$ (DS-2) | S-ELP$^b$ | 1 | 400 | 100 | 0.46 | 4.6 | 25938 | 5.11 | 0.783 | This work |

$^1$Physical vapor deposition-magnetron sputtering. $^2$Simultaneous electroless plating

*FIG. 6*

ADVANCED DOUBLE SKIN MEMBRANES FOR MEMBRANE REACTORS

CROSS-REFERENCE TO RELATED APPLICATIONS

This application is a 371 of PCT application PCT/EP2017/081835 filed Dec. 7, 2017. PCT application PCT/EP2017/081835 claims the benefit of U.S. Provisional application 62/431,733 filed Dec. 8, 2016.

FIELD OF THE INVENTION

The present invention relates generally to hydrogen production. More particularly, the invention relates to a double skinned membrane having a thin film of Pd covered by a nanoporous protective layer of ceramic.

BACKGROUND OF THE INVENTION

Palladium-based membranes are well known for their use as hydrogen separation devices with high purity hydrogen as product. A great research effort has been spent over the last decades to produce membranes with a high hydrogen flux, large perm-selectivity and low price. Production of ultra-pure hydrogen for small-scale applications is currently being investigated through steam reforming of methane (or other feedstocks, such us ethanol and methanol) followed by separation of hydrogen with Pd-based membranes (or other techniques). The integration of membranes into a reactor to produce and in situ separate the hydrogen, accomplishes a decrease in the required number of process units. Moreover, many other positive aspects result from this process integration, such as the increase in conversion of the feedstock to hydrogen due to the continuous removal of one of the products thereby shifting the equilibrium according to Le Châtelier's principle.

Two types of membrane reactor concepts have been mainly studied: packed beds and fluidized beds. The performance of packed-bed membrane reactors is strongly impaired by hot (cold)-spots due to low heat transfer rates as well as by concentration polarization, especially for membranes with a high perm-selectivity, such as Pd supported membranes. In fluidized bed membrane reactors (FBMR) the vigorous motion and circulation of the catalyst inside the reactor enhances both the mass and heat transfer rates. Industrial exploitation of membrane-assisted fluidized bed membrane reactors is affected by the hydrogen production capacity and the required number of membranes, which depends on the thickness of the selective layer. Self-supported membranes would require an enormous number of membranes, whereas thin film supported membranes seem to be the most interesting option. The thinner the layer, the larger the permeated $H_2$ flux and thus the smaller the required membrane area (thus having a double benefit in terms of Pd costs). Nevertheless, thin layers (<4-5 μm) generally are not perfectly dense and often present a few small pores where other gases could pass through, decreasing the purity of permeated hydrogen. Even if the membranes exhibit a high perm-selectivity, once they are integrated into a fluidized bed membrane reactor, they have to resist erosion from the scouring action of the fluidized catalyst.

Palladium-based membranes are well known for their use as hydrogen separation devices with high purity hydrogen as product. A great research effort has been spent over the last decades to produce membranes with a high hydrogen flux, large perm-selectivity and low price. Production of ultra-pure hydrogen for small-scale applications is currently being investigated through steam reforming of methane (or other feedstocks, such us ethanol and methanol) followed by separation of hydrogen with Pd-based membranes (or other techniques). The integration of membranes into a reactor to produce and in situ separate the hydrogen, accomplishes a decrease in the required number of process units. Moreover, many other positive aspects result from this process integration, and in particular the increase in conversion of the feedstock to hydrogen due to the continuous removal of one of the products thereby shifting the equilibrium according to Le Châtelier's principle.

Two types of membrane reactor concepts have been mainly studied: packed beds and fluidized beds. The performance of packed-bed membrane reactors is strongly impaired by hot (cold)-spots due to low heat transfer rates as well as by concentration polarization, especially for membranes with a high perm-selectivity, such as Pd supported membranes. In fluidized bed membrane reactors (FBMR) the vigorous motion and circulation of the catalyst inside the reactor enhances both the mass and heat transfer rates. Industrial exploitation of membrane-assisted fluidized bed membrane reactors is affected by the hydrogen production capacity and the required number of membranes, which depends on the thickness of the selective layer. Self-supported membranes would require an enormous number of membranes, whereas thin film supported membranes seem to be the most interesting option. The thinner the layer, the larger the permeated $H_2$ flux and thus the smaller the required membrane area (thus having a double benefit in terms of Pd costs). Nevertheless, thin layers (<4-5 μm) generally are not perfectly dense and often present a few small pores where other gases could pass through, decreasing the purity of permeated hydrogen. Even if the membranes exhibit a high perm-selectivity, once they are integrated into a fluidized bed membrane reactor, they have to resist erosion from the scouring action of the fluidized catalyst.

In comparison with ceramic supported membranes, metallic supported membranes provide a much higher mechanical strength and relatively easy integration into a reactor. However, their long-term use in a fluidized bed membrane reactors at high temperatures (>400° C.) is limited, since defects can appear due to the mobility of the atoms present in the selective layer or due to attrition by the fluidized particles.

What is needed is a hydrogen permeable membrane with a high permeability and perm-selectivity and attrition resistance against particles to be integrated into a fluidized bed membrane reactor.

SUMMARY OF THE INVENTION

To address the needs in the art, a hydrogen permeable membrane device is provided that includes a hydrogen selective Pd film or Pd-alloy film and a porous protective layer deposited on the a selective film having a material that includes zirconia, Yttria-stabilized zirconia (YSZ), $\gamma/Al_2O_3$, and/or YSZ— $\gamma/Al_2O_3$, silica, titania, magnesia, ceria, nitrides, and silicon carbide.

According to one aspect of the invention, the porous protective ceramic layer includes pore sizes in a range of 1 to 400 nm, or in a range of 1 to 50 nm, or in a range of 2 to 20 nm.

In another aspect, the invention further includes a porous support layer. Here, the porous support layer includes a metal, a ceramic, or a metal and a ceramic. Further, the ceramic porous support layer includes a material that includes an oxide, nitride, and/or a carbide. According to this embodiment, the porous support layer includes pore sizes in a range of 2 nm to 50000 nm.

In yet another aspect of the invention, the hydrogen selective Pd layer or the Pd-alloy layer has a thickness in a range of 0.5 to 150 μm.

According to a further aspect of the invention, the porous protective ceramic layer has a thickness in a range of 0.5 to 150 μm.

In one aspect of the invention, the porous ceramic layer is catalytic by introducing inside the pores a catalyst, for example ZnO, Pt, Ni, Rh, Ru, Ag, Pd, or mixture of metals such as Pt—Rh, Pd—Ag, Pt—Pd.

In another aspect the invention includes a housing that encapsulates the hydrogen permeable membrane, where the housing includes a retentate end and a permeate end. According to one aspect of this embodiment, the housing includes a material that can include stainless steel, carbide, ceramic, and/or Hastelloy. Here, the housing is disposed in a hydrogen production reaction vessel, where the produced hydrogen passes from the housing retentate end to the housing permeate end. In a further aspect, the housing has a shape that can be tubular, micro-channels, planar, and/or parallel plates.

BRIEF DESCRIPTION OF THE DRAWINGS

FIG. 6 shows Table 2 "Permeation properties of Pd-based supported membranes reported in the literature," according to embodiments of the invention.

DETAILED DESCRIPTION

Figure 1A:
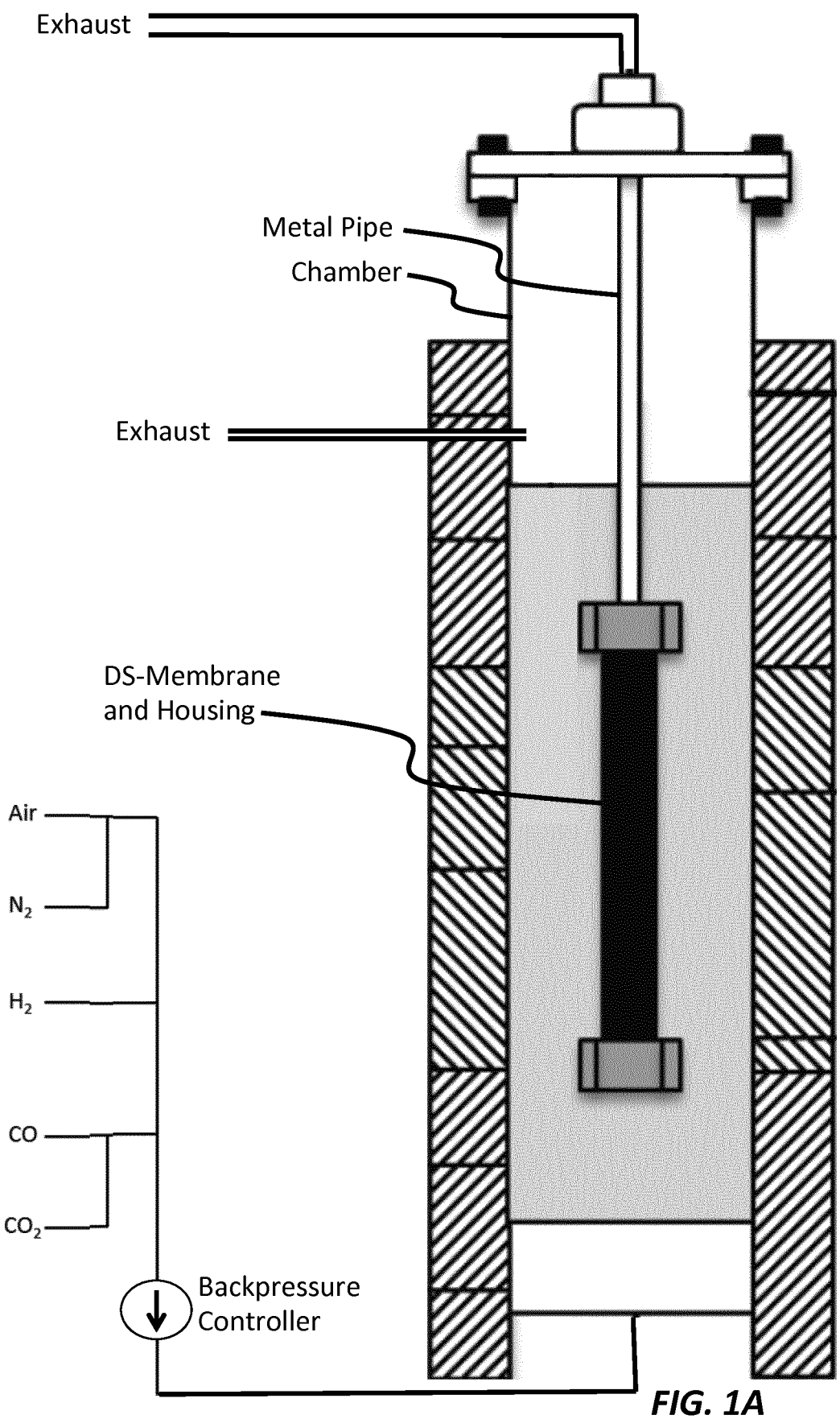
FIGS. 1A-1B show (1A) a PID of the setup for the permeation measurements, (1B) a reactor vessel having double skinned membranes, according to one embodiment of the invention.

Provided herein is a hydrogen permeable membrane with a high permeability and perm-selectivity and attrition resistance against particles to be integrated into a fluidized bed membrane reactor. According to one embodiment, the membrane is produced by depositing a protective layer on top of a very thin selective Pd-based layer. In another embodiment, the Pd—Ag layer is prepared by simultaneous ELP (electroless plating) and the protective layer by dip-coating. For an embodiment of a metallic porous support, before deposit the hydrogen selective layer, a ceramic interdiffusion barber is deposited by dip-coating.

According to one embodiment, the invention includes a hydrogen permeable membrane device having a porous substrate, a palladium nuclei layer deposited on the porous substrate, where the palladium nuclei of the palladium nuclei layer are disposed within pores of the porous substrate, a Pd—Ag layer deposited on the palladium nuclei layer, and a mesoporous ceramic layer deposited on the Pd—Ag layer.

Permeation characteristics of the membranes were studied by single gas tests and by tests with binary gas mixtures. According to the invention, the ceramic supported double-skinned membranes showed a high hydrogen permeance and $H_2/N_2$ perm-selectivity. Furthermore, the resistance of the membrane under fluidization conditions for two types of particles (glass beads and Rh onto promoted alumina) during long-term tests is presented. Also the interaction with $TiO_2$ based catalyst is provided under fluidization conditions and compared with a conventional membrane without protective layer.

Conventional metallic supported membranes and double-skin (DS) membranes of the current invention have been tested under fluidization conditions and their performance is compared to investigate the long-term stability of the membranes. It was found that in the temperature range of 400-500° C., conventional supported membranes suffer from a pronounced decay in the initial ideal $H_2/N_2$ permselectivity in presence of the fluidized catalyst, whereas the DS-membranes of the current invention maintain much higher selectivities at the same conditions.

Turning now to the preparation of the DS-membranes, according to one embodiment, porous tubular substrates (10/4 mm o.d./i.d.) made by $\alpha$-$Al_2O_3$ with an asymmetrical geometry were provided by Rauschert Kloster Veilsdorf and used as porous support with a top layer of 100 nm pore size. The porous substrates were joined with dense ceramic tubes using a glass sealant (ASF-1761, Asahi Glass Co.), following a procedure reported before.

Prior to the simultaneous deposition of the Pd—Ag layer, the porous substrates were activated with palladium nuclei by dipping the supports into a chloroform solution of palladium acetate, followed by reduction with hydrazine, as reported before. The tubular supports with palladium seeds were immersed into a plating bath for co-deposition of the Pd—Ag layer. The composition of the bath used in this example is summarized in Table 1. The co-deposition was carried out at 64° C. for 1 hour. For the last 45 minutes of deposition vacuum was applied from inside the tube to close the pores of the support.

TABLE 1

Chemical composition of electroless plating bath.

| Chemicals | Concentration (M) |
| --- | --- |
| Palladium acetate | 0.01 |
| Silver nitrate | $3.23 \cdot 10^{-4}$ |
| EDTA | 0.15 |
| Ammonia | 5 |
| Hydrazine | 0.013 |

After the Pd—Ag layer deposition, the samples were washed with distilled water, dried overnight, and annealed at 550° C. for 4 h in a reducing atmosphere (10 vol. % $H_2$/90 vol. % $N_2$). Nitrogen was fed during heating (3° C. $min^{-1}$) and cooling steps. Finally, a thin (<1 µm) mesoporous ceramic layer (50% YSZ/50% $\gamma$-$Al_2O_3$) was deposited on top of the Pd—Ag layer by a dip-coating technique.

In a further embodiment, a metallic supported membrane is prepared by coating a ceramic interdiffusion barrier onto a Hastelloy® X, a solid solution strengthened nickel-chromium-iron-molybdenum alloy (0.2 µm media grade) porous support. The hydrogen selective layer (4-5 µm) includes Pd and Ag and is deposited by electroless plating. On the OS-membrane, a porous ceramic layer (protective layer) is deposited by dip-coating followed by calcination at 550° C.

Turning now to the physic-chemical characterization of the OS-membrane, the cross-section of the OS-membranes was analyzed by a Scanning Electron Microscope (FEI Quanta 250 FEG). For each membrane at least four measurements were carried out to determine the layer thickness. The Pd—Ag composition in the selective layer was calculated by measuring by ICP-OES (Varian Vista MPX Inductively Coupled Plasma Optical Emission Spectrometer) the concentration of silver and palladium in the plating bath before and after the deposition of the layer. The pore size and surface area of the protective layer was characterized by BET.

For permeation measurements, one end of the ceramic supported membranes teas connected to a dense metallic tube and the other end was closed with a metallic tap using graphite ferules. The connectors were tightened to the membrane with a torque wrench applying 7 Nm. The total length of the membranes with the connector was 150 mm. Once the sealings were tightened, a leak test was performed by feeding helium from the inside of the membrane while the membrane was submerged in ethanol. No bubbles were detected from the sealing parts, indicating that the sealings were properly tightened. Finally, the membranes were dried to remove ethanol and integrated into the reactor. The permeation setup used for the gas permeation measurements (single gas test and gas mixtures) is shown in FIG. 1A. A shell and tube module was made from stainless steel with an inner diameter of 42.7 mm. The gas pressure in the shell side was controlled with a backpressure controller connected to the retentate side. The permeate side of the membrane was kept at atmospheric pressure. No sweep gas was applied during the experiments, while the hydrogen flux was measured with an automated mass flow meter (Defender 220) and nitrogen with an automated soap film flow meter for flow rates >0.2 mL $min^{-1}$ (Horiba, model VP1) and another soap bubble flow meter for flow rates <0.2 mL $min^{-1}$. Single gas tests were carried out at temperatures between 300-500° C. with nitrogen and hydrogen. Mixed gas permeation tests with $H_2$—$N_2$ and $H_2$—$CO_2$ mixtures were performed at 400° C. The invention can be further configured for separating/purifying hydrogen gas from gas mixtures.

Figure 1B:
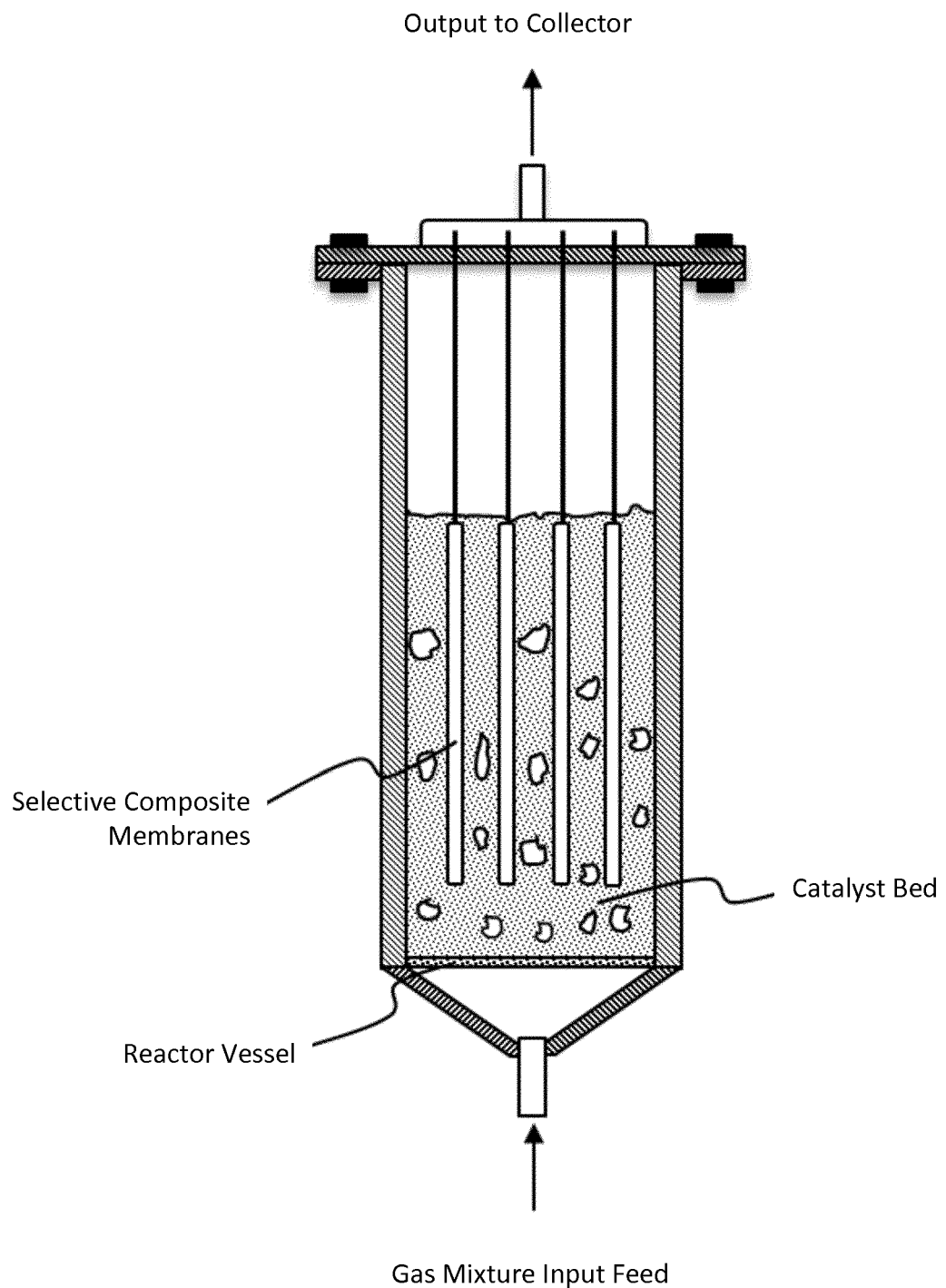

FIG. 1B shows a schematic section view of reactor vessel according to the invention. Gas mixture is fed and distributed along reactor vessel. Gas mixture reacts with catalyst bed producing hydrogen. Pure hydrogen passes through hydrogen selective composite membranes and is collected.

For the case of the metallic supported membranes were integrated at the same time in a single reactor in order to assess and compare the performance of both membranes under identical conditions.

Figure 2A:
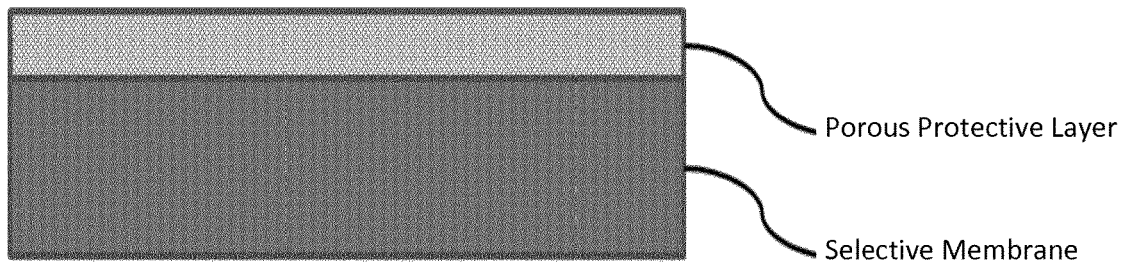
FIGS. 2A-2E show (2A) a bi-layer system having a selective (Pd-based) membrane and a porous protective layer, (2B) further including a porous inorganic support under the selective membrane, (2C) a protective layer composed of two sublayers, and SEM cross-section images of double skinned membranes, where DS-2 (2D) and DS-3 (2E), according to embodiments of the invention.
Figure 2B:
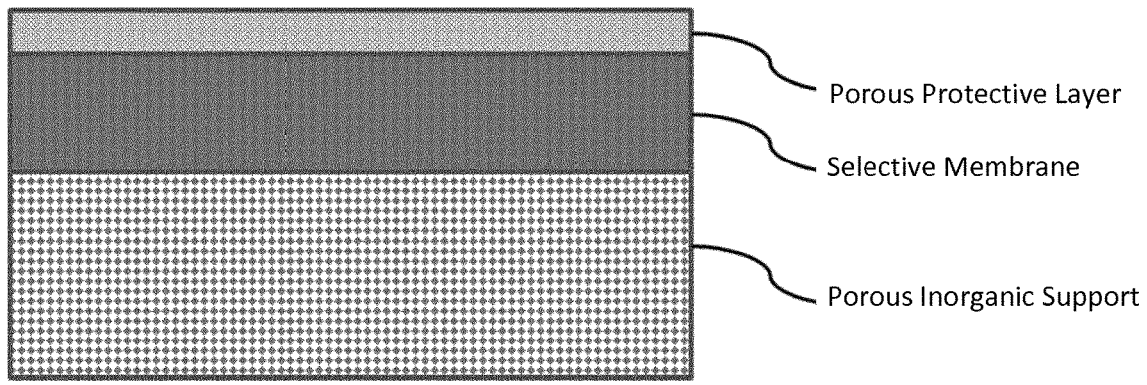

FIGS. 2A-2E show some exemplary embodiments of the invention, where FIG. 2A shows a bi-layer system that includes the selective membrane and a porous protective layer. In one aspect, the protective layer is deposited on the defects of the selective membrane for improving the selectivity of the membrane. Here, the selective membrane is a dense (e.g. palladium and its alloys, perovskites) or microporous (e.g. carbon) selective membrane. According to another embodiment, the selective membrane is any inorganic hydrogen selective membrane material. In another embodiment, the membrane is self-supported as shown in FIG. 2A or supported on a porous inorganic support, as shown in FIG. 2B, shown is the porous inorganic support. Further, the porous protective layer is composed of one material or a mixture of materials, such as metal oxides (e.g. alumina, $ZrO_2$, YSZ, silica, titania, ceria, magnesia), nitrides, and/or silicon carbide.

Figure 2C:
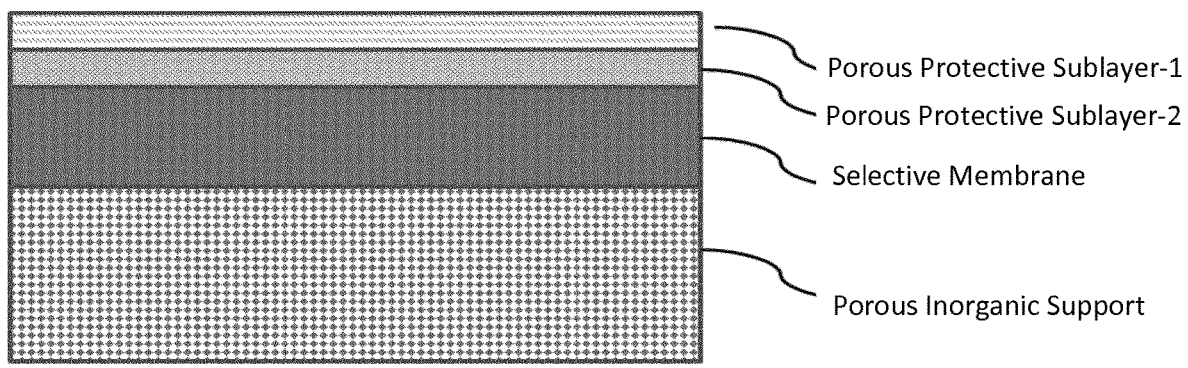
Figure 2D:
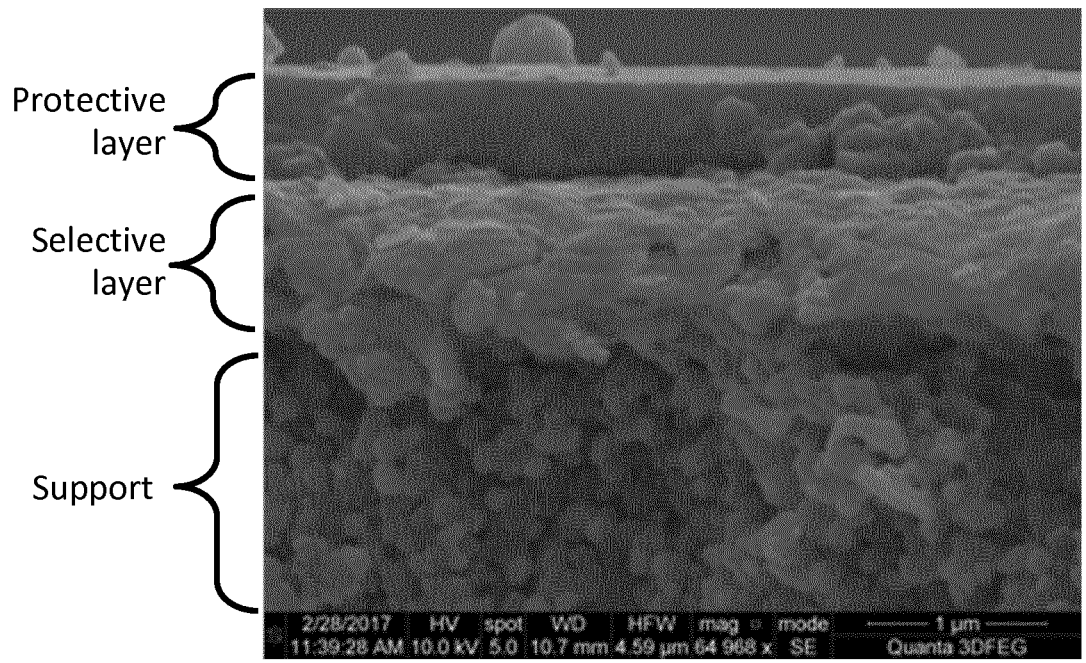
Figure 2E:
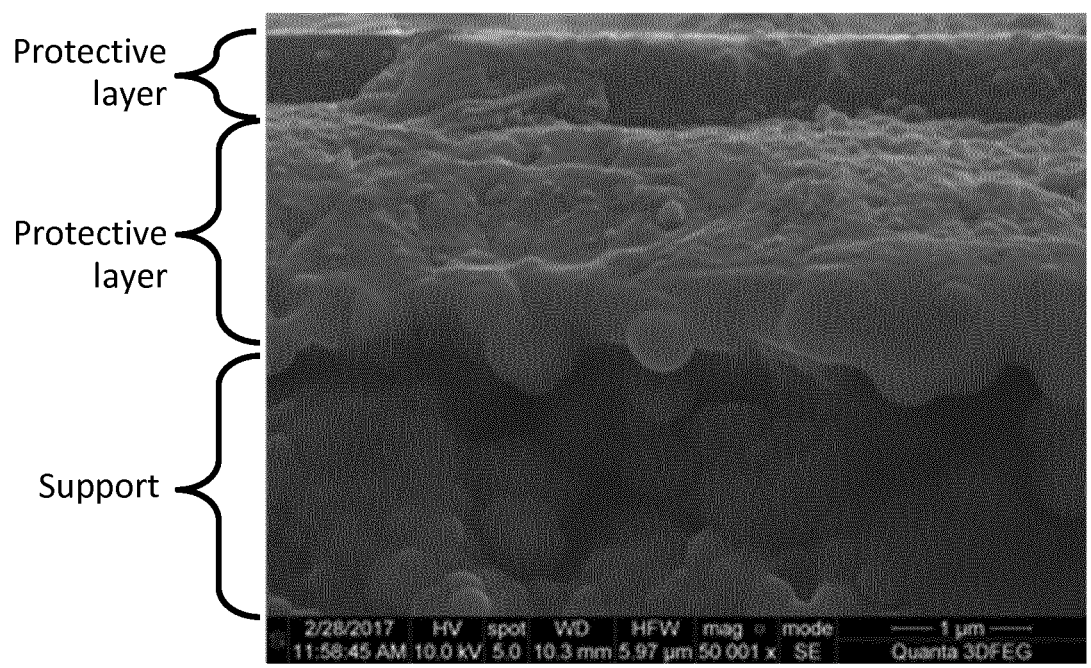

In a further embodiment of the invention, the protective layer is composed of one layer or several layers. FIG. 2C shows a protective layer composed of two sublayers. In one embodiment, the protective layer has a thickness between 0.2 µm to 6 µm, better between 500 nm and 2 µm, or has a thickness in a range of 0.5 to 150 µm. The porous protective layer can be coated on the membrane by various techniques including and not limited to sol-gel, dip-coating, wet powder spraying, atmospheric plasma spraying, spray coating, Sputtering (PVD-Magnetron Sputtering), or Chemical Vapor Deposition (CVD).

The thickness of the selective and protective layers have been determined by SEM images of the cross section of DS-2 (FIG. 2D) and DS-3 (FIG. 2E) membranes. The thickness of the selective layer was determined at ~1 µm (±0.26) and ~1.8 (±0.23) µm for DS-2 and DS-3, respectively. The thickness of the DS-2 protective layer was ~0.5

µm (±0.06) and for the case of DS-3 a bit thicker, ~0.67 µm (±0.10). An EDS mapping of the cross-section of the DS-3 membrane has been performed for palladium, silver, aluminum and oxygen. From these images it was confirmed that the Pd—Ag selective layer is placed between the alumina support and the protective ceramic layer. The surface area (300 m$^2$g$^{-1}$) and pore size (1-5 nm) of the protective layer were characterized by BET.

The DS-membrane could have any shape and size but preferentially tubular or planar. Further, the protective layer is configured to protect from mechanical damage such as in fluidized bed conditions.

In another embodiment, the invention is configured for producing hydrogen gas that includes a catalyst bed (fluidized or packed) of a suitable catalyst in a reactor. Here, the current embodiment includes introducing a mixture of carbon-containing gas (methanol, ethanol, methane, or propane) and steam (and/or oxygen) to the reactor vessel containing a catalyst. Further, the current embodiment includes separating the hydrogen gas from the mixture through a hydrogen selective membrane.

In another embodiment, the protective layer is configured to prevent the chemical reaction between the catalyst and the selective membrane in reactions involving the production of hydrogen. For example, catalyst containing ZnO or TiO2 can react with Pd membrane reducing the hydrogen permeation performance.

In a further embodiment, the protective layer is configured to eliminate or diminish the formation of carbon on the surface of hydrogen selective membranes such as the deposition of carbon in reactions containing organic gases (e.g. propane dehydrogenation with Pd membranes). The protective layer is further configured as a barrier for H$_2$S to react with hydrogen selective membrane decreasing the hydrogen permeation or destroying the membrane. The protective layer can be a layer of a material that reacts with H$_2$S such that this gas will not reach the selective layer. In yet another aspect, the protective layer is functionalized for acting as a catalytic membrane reactor. For example, by introducing a catalyst in the pores that produces hydrogen and then the produced hydrogen passes through the selective membrane. Further, the protective layer is functionalized by introducing active compounds in the pores that can interact with substances that can damage the selective membrane.

Turning now to the membrane permeation properties in an empty reactor. The equation describing the hydrogen flux through Pd-based membranes is written in terms of Sieverts' law as follows:

$$J = \frac{Pe}{t}(p_{H2,ret}^n - p_{H2,perm}^n), \quad (Eq.\ 1)$$

where J is the hydrogen flux, Pe is the permeability, t the thickness of the selective layer, $p_{H2}$ is the hydrogen partial pressure at the permeate and retentate side respectively and n the pressure exponent.

Figure 3:
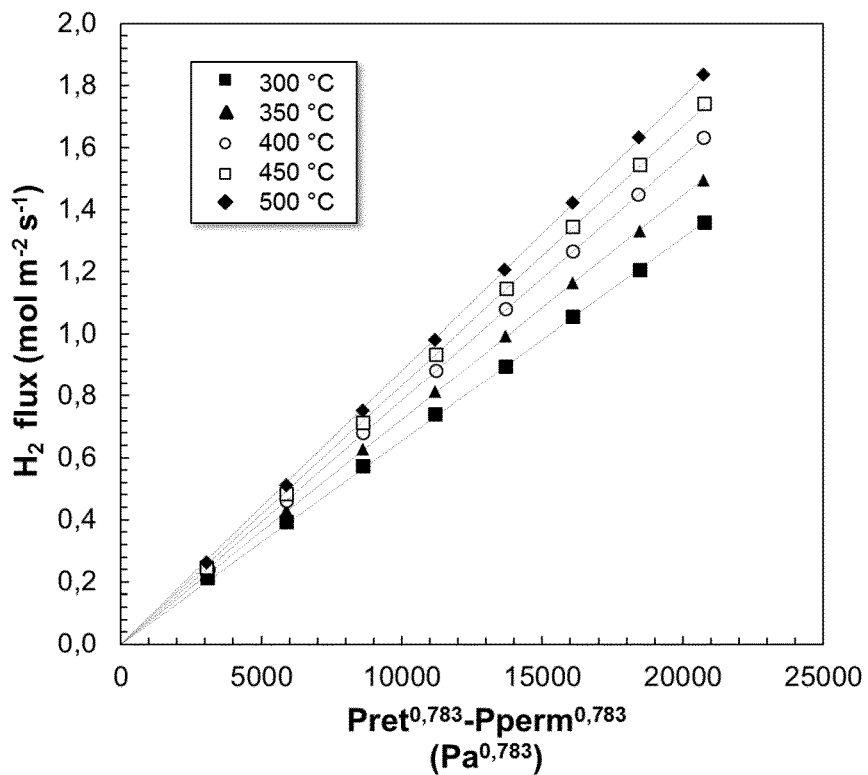
FIG. 3 shows measured hydrogen flux from 300° C. to 500° C. after activation in air at 400° C. as a function of the hydrogen pressure difference, according to embodiments of the invention.

In FIG. 3 hydrogen fluxes through the DS-2 membrane at different temperatures (300-500° C.) and different trans-membrane pressures differences are shown. The best fit for the hydrogen fluxes (J) and ($p_{H2,ret}^n - p_{H2,perm}^n$) was found for a pressure exponent value n of 0.783 (after activation in air at 400° C. during 2 minutes). For Pd-based membranes, the pressure exponent should equal 0.5 in case the rate limiting step is diffusion through the bulk of the palladium. Since the determined n-value deviates from 0.5, this may indicate the influence of Knudsen diffusion in the mesoporous protecting layer (1-5 nm pore size) and/or viscous flow in the porous support (100 nm pore size) on the overall hydrogen permeation rate; if both these cases were rate limiting, the n-value would be unity. Moreover, the rate-limiting step in thin membranes are surface reactions rather than bulk-diffusion. Thus the n-value is larger than 0.5.

Fluxes measured in the temperature range 300-500° C. were used to estimate the activation energy for hydrogen permeation through the membrane. The permeance depends on the temperature according to the Arrhenius relation given by, $$Q = Q_0 e^{-\frac{Ea}{RT}} \xrightarrow{Ln} \ln Q = \ln Q_0 - \frac{Ea}{RT}, \quad (Eq.\ 2)$$

where Q is the permeance of the membrane, Q$_0$ the pre-exponential factor, Ea the activation energy, R the universal gas constant, and T the absolute temperature. One of the assumptions of this equation is that the pressure exponent n does not vary with temperature.

Figure 4:
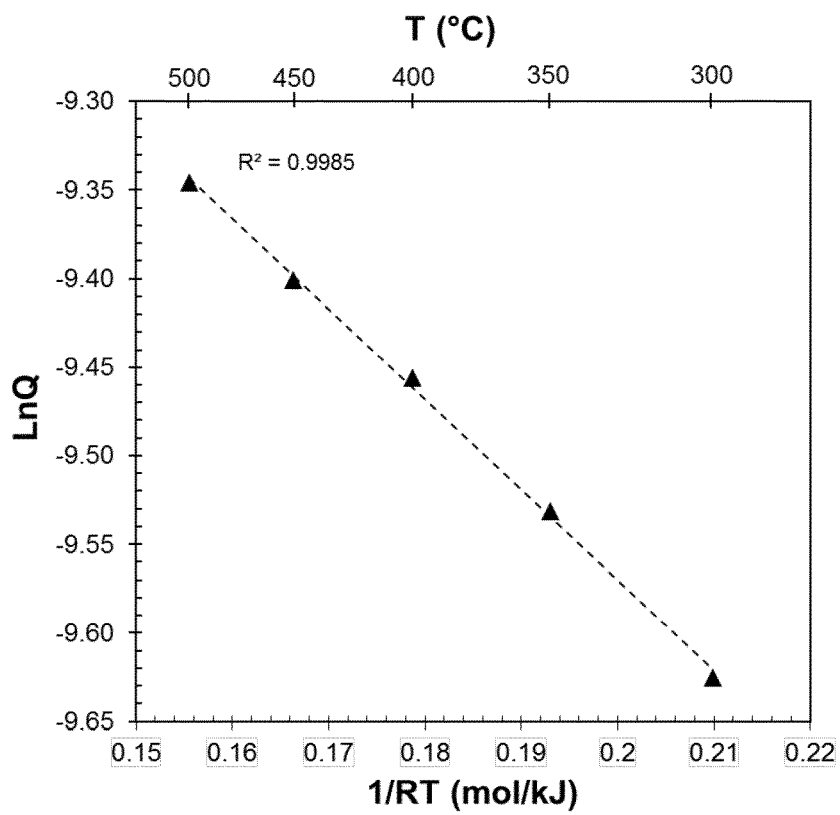
FIG. 4 shows Arrhenius plot based on the $H_2$ permeance after activation in air at 400° C., according to embodiments of the invention.

By plotting the natural logarithm of the calculated permeances as a function of 1/RT (see FIG. 4) the activation energy was determined at 5.11 kJ mol$^{-1}$. This activation energy is a lumped value including the permeation through the mesoporous protective layer, the dense metal layer and the support. This value is similar to values reported by Melendez et al. [10] who reported activation energies ranging from 5.47 to 7.81 kJ mol$^{-1}$ for membranes with a similar content of silver (5.7 to 9 wt. %) and with the same range of thicknesses of the selective layer (0.46 to 129 µm). Many parameters can affect to the activation energy, such as the thickness of the selective layer, the grain microstructure of the layer and the preparation method.

Figure 5:
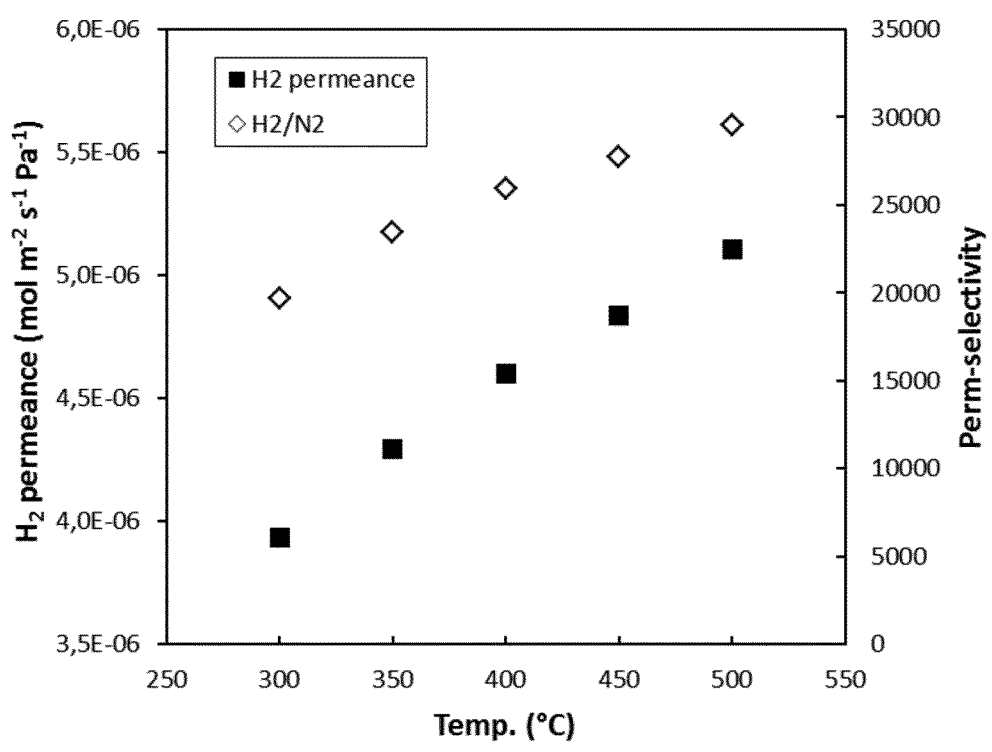
FIG. 5 shows $H_2$ permeance and $H_2/N_2$ perm-selectivity in the temperature range of 300-500° C. and 1 bar of pressure difference for the DS-2 membrane, according to embodiments of the invention.

The measured hydrogen and nitrogen fluxes during single gas tests were used to calculate the H$_2$/N$_2$ ideal perm-selectivity of the membrane. The hydrogen permeances and H$_2$/N$_2$ perm-selectivities at different temperatures (300-500° C.) and 1 bar of pressure difference are shown in FIG. 5. The nitrogen leakage at 1 bar of pressure difference was 2·10$^{-10}$ mol m$^{-2}$ s$^{-1}$ Pa$^{-1}$ and 1.7·10$^{-10}$ mol m$^{-2}$ s$^{-1}$ Pa$^{-1}$ at 300° C. and 500° C., respectively showing a Knudsen permeation mechanism probably due to the permeation through the mesoporous protective layer where the Pd—Ag layer is not present.

In FIG. 6, the permeation properties of reported supported Pd-based membranes thinner than 3 µm are listed. It has been reported that a 1.4 µm thick Pd$_{77}$Ag$_{23}$ layer supported into a microchannel reactor with a hydrogen flux of 22.5·10$^{-6}$ mol m$^{-2}$ s$^{-1}$ Pa$^{-1}$ at 300° C. and 1 bar of pressure difference. The selectivity of this membrane was 5700 at the beginning of the test. However, after 7 days of testing this value decreased to 390. Concerning the tubular supported Pd-based membranes, the largest hydrogen flux was also reported with a ~1.9-3.9 µm thick Pd$_{77}$Ag$_{23}$ film prepared by PVD-MS and transferred to a PSS tube. At 400° C., the H$_2$ flux at 1 bar of pressure difference was 14.9·10$^{-6}$ mol m$^{-2}$ s$^{-1}$ Pa$^{-1}$, while the selectivity was 7700. A similar flux was reported for a very thin (0.49 µm) Pd$_{91}$Ag$_9$ membrane supported onto a ceramic porous substrate. However, this high flux was achieved at the expense of a low perm-selectivity (48). Membranes with different thicknesses were tested and the best selectivity (3500) was measured for the membrane with the larger thickness, with a high H$_2$ permeance at 400° C. of 9.2·10$^{-6}$ mol m$^{-2}$ s$^{-1}$ Pa$^{-1}$. The best combination of flux and selectivity at 400° C. was reported, which measured a $H_2$ flux at 1 bar pressure difference of $5.1 \cdot 10^{-6}$ mol m$^{-2}$ s$^{-1}$ Pa$^{-1}$ for a 2.5 μm-thick $Pd_{80}Ag_{20}$ membrane with a selectivity over 10000. According to the current invention, a membrane (DS-2 with 5 wt. % Ag) has been produced with a selective layer of ~1 μm with a similar flux ($4.6 \cdot 10^{-6}$ mol m$^{-2}$ s$^{-1}$ Pa$^{-1}$) and a $H_2/N_2$ perm-selectivity of ~26000. The results reported in this work are one of the best reported in terms of the combination of a high permeability and selectivity.

Figure 7:
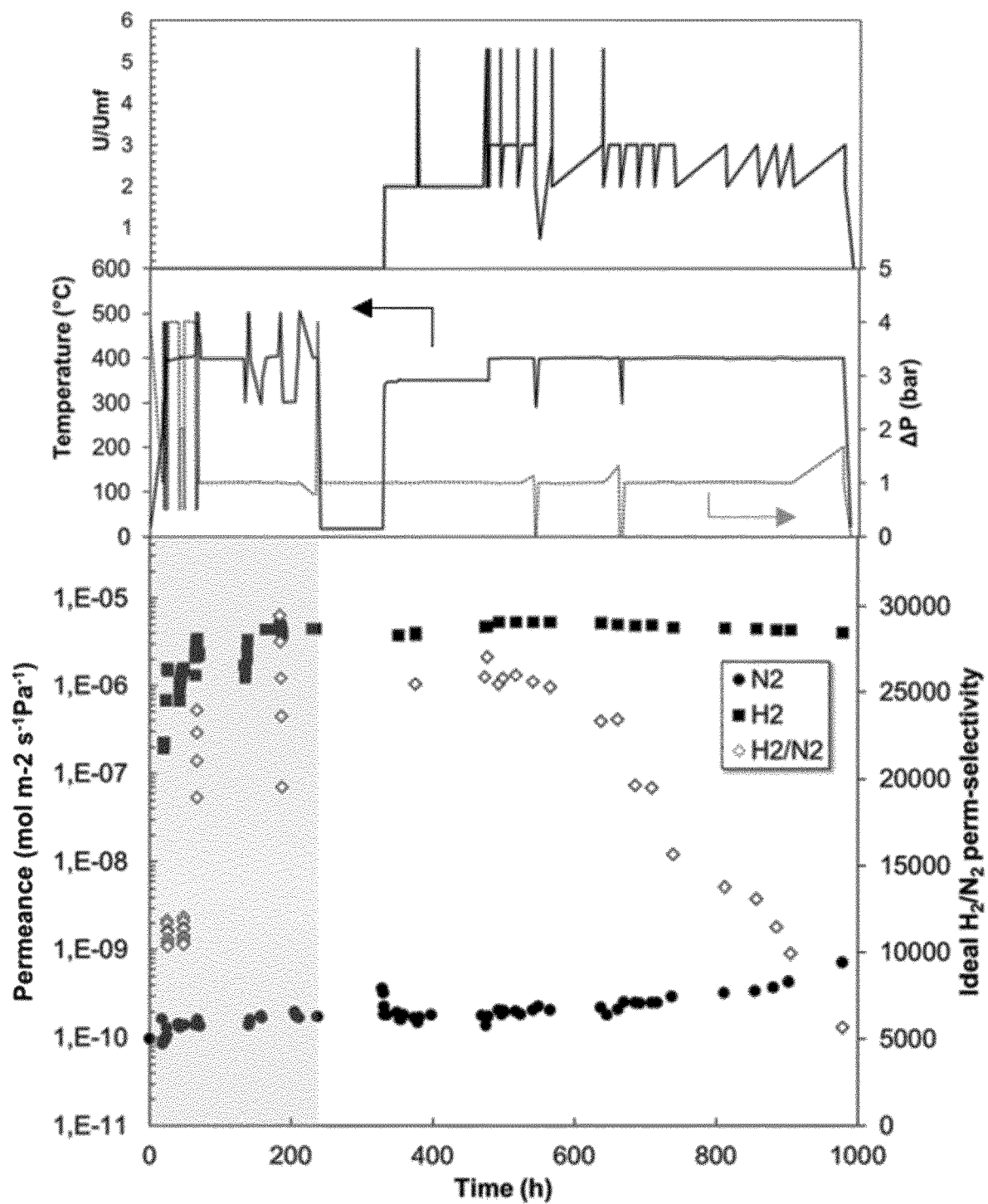
FIG. 7 shows hydrogen and nitrogen permeances and ideal perm-selectivity of membrane DS-2 during long-term test. First 250 h in absence of glass beads. Rest of test was performed in presence of particles under bubbling fluidization regime. Temperature, pressure and U/Umf profiles during the test are represented above the figure, according to embodiments of the invention.

Once the membrane (DS-2) properties were studied with tests with single gas and binary gas mixtures in absence of glass beads, shown in FIG. 7 for the first 250 h with the grey background, the reactor was cooled down to room temperature in order to introduce glass beads with a particle size of 250-350 μm. The volume of the catalyst was enough to completely cover the membranes. Subsequently, the reactor was heated again to 350° C. and the particles were fluidized ($U/U_{mf}=2$) for 100 h. Then, the fluidization velocity was increased to $U/U_{mf}=3$ and the temperature to 400° C. (1 bar of transmembrane pressure). The same binary gas mixture tests as performed before the introduction of the particles were repeated to evaluate the effect of the presence of fluidized particles on the bed-to-membrane mass transfer limitations. The total flow rate was varied from 10 to 20 L min$^{-1}$. Thus, the membrane surface suffer more attrition since the fluidization velocity and particle mixing increase. The $H_2/N_2$ perm-selectivity was around 25000, while after the introduction of the particles the selectivity started decreasing until the end of the long-term test (after 975 h the selectivity decreased to 5500). During the fluidization tests with glass beads, the filter downstream of the retentate side was clogged twice. The temperature was decreased to 300° C. to be able to clean the filter (see the peaks on the temperature and pressure in FIG. 7). A grey powder was found and this was characterized by XRD. The diffractogram obtained corresponds to glass beads (composed mainly of $SiO_2$). This indicates that particles were breaking during the tests probably due to erosion with reactor walls and the membrane surface. Once the long-term test was concluded and the module was cooled down, it was observed that the protective layer was removed from the surface of the membrane. As the selectivity had decreased, a leak test was performed to localize the position of the leakage. As described above, the membrane was pressurized to 1 bar with helium from the inner side of the membrane while it was submerged into ethanol. The membrane was dipped slowly to assess which part of the membrane was responsible for the gas leakage. It was found that the sealing (both top and bottom sealing) were responsible for the leakage and not the membrane surface. Thus, even though the protective layer was removed, the selective layer was still intact. It could be expected that the protective layer was removed due to the collisions of the hard glass particles with the membrane surface. To assess this, other tests were performed with actual catalyst particles with a higher hardness compared to glass.

For the binary mixtures, the membrane DS-2 (with 5 wt. % of silver) was tested with binary mixtures of $H_2$—$N_2$ and $H_2$—$CO_2$ varying the hydrogen feed content from 50 to 100 vol. %. Permeation tests were carried out at 400° C. with a total feed flow rate fixed at 10 L min$^{-1}$. Those experiments were repeated in the presence of fluidized glass beads. In this case, different feed flow rates were studied (10, 15 and 20 L min$^{-1}$). In all cases the permeate side was maintained at atmospheric pressure.

Figure 8A:
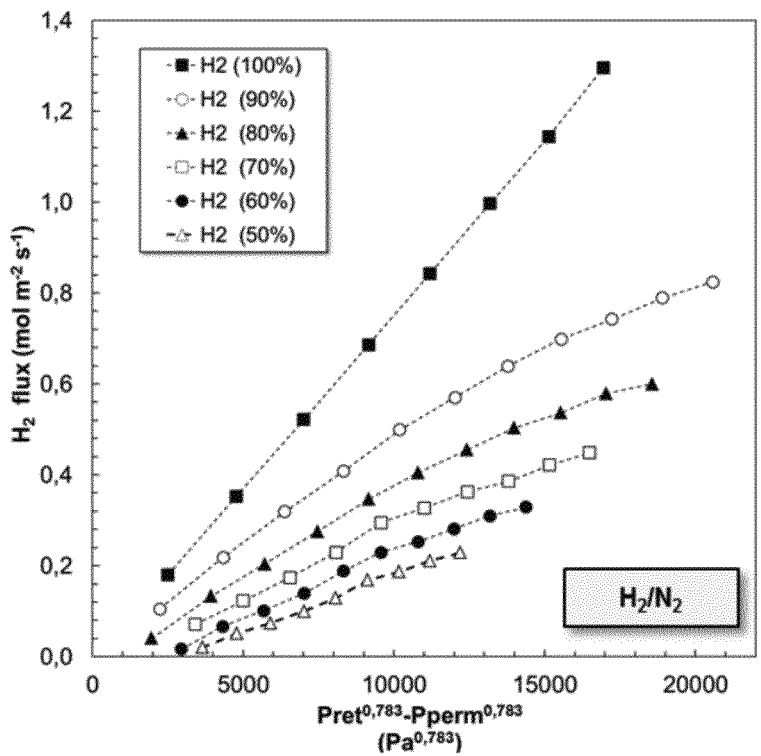
FIGS. 8A-8D show hydrogen transmembrane flux of DS-2 at 400° C. vs driving force over calculated n-value (0.783) of binary mixtures: (8A) $H_2$—$N_2$, (8B) $H_2$—$N_2$ with glass beads, (8C) $H_2$—$CO_2$ and (8D) $H_2$—$CO_2$ with glass beads from 50 to 100% of $H_2$ purity in volume. Total feed flow: 10 L min$^{-1}$, according to embodiments of the invention.
Figure 8B:
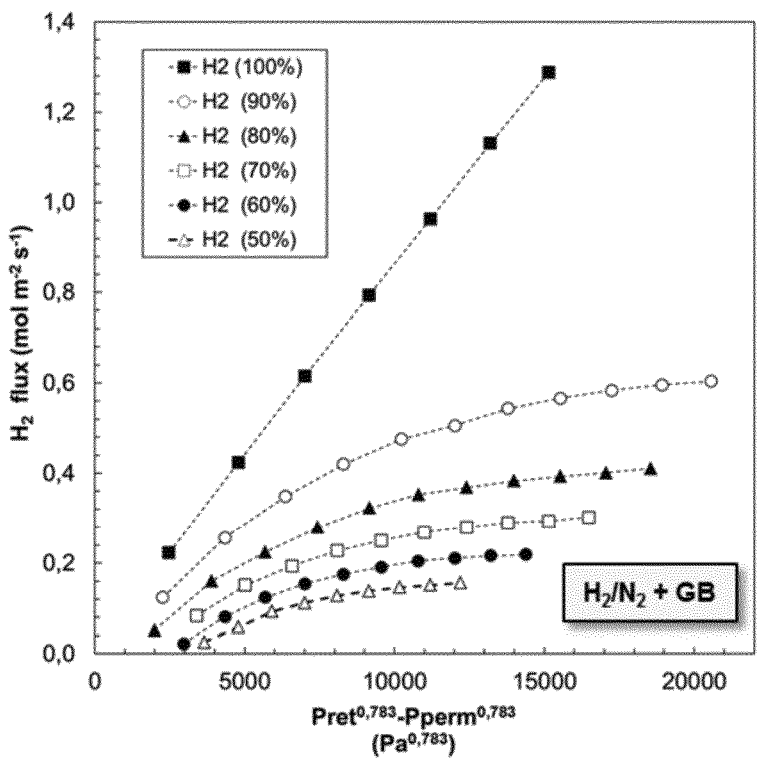
Figure 8C:
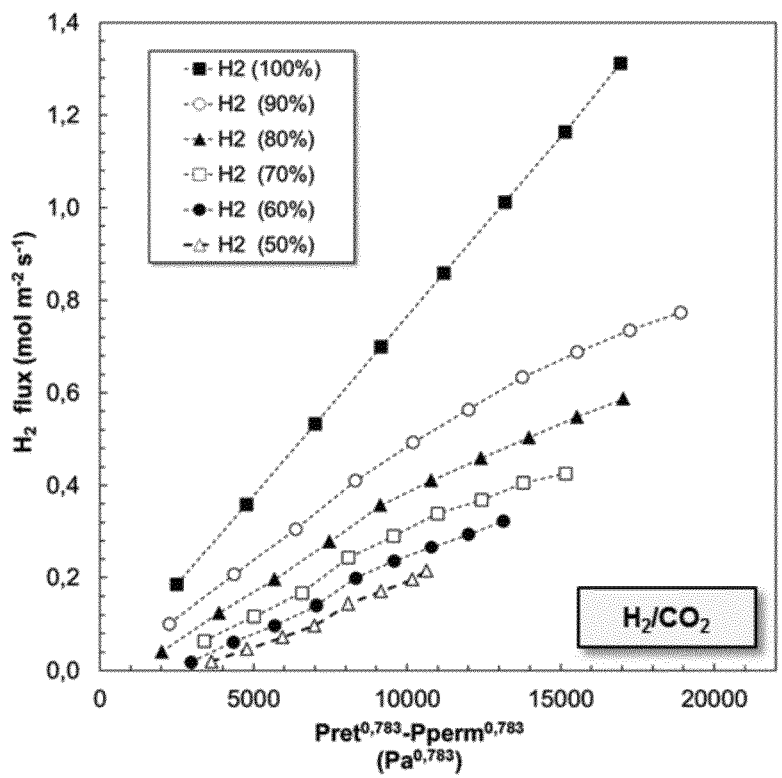

FIG. 8A and FIG. 8C show that the hydrogen flux decreased significantly in the presence of $N_2$ or $CO_2$, even if only 10 vol. % of $N_2$ or $CO_2$ was mixed with $H_2$. The decrease in the $H_2$ flux is very similar for all the studied mixtures, so that no interaction of $CO_2$ with the membrane (nor reverse water gas shift) was observed. These results suggest the formation of a concentration mass transfer boundary layer in the gas phase, which reduces the $H_2$ concentration in the proximity of the membrane surface. This phenomenon, referred to as concentration polarization, becomes prominent for membranes with a high $H_2$ permeance, even if the $H_2$ volume fraction in the retentate side is still high.

Figure 8D:
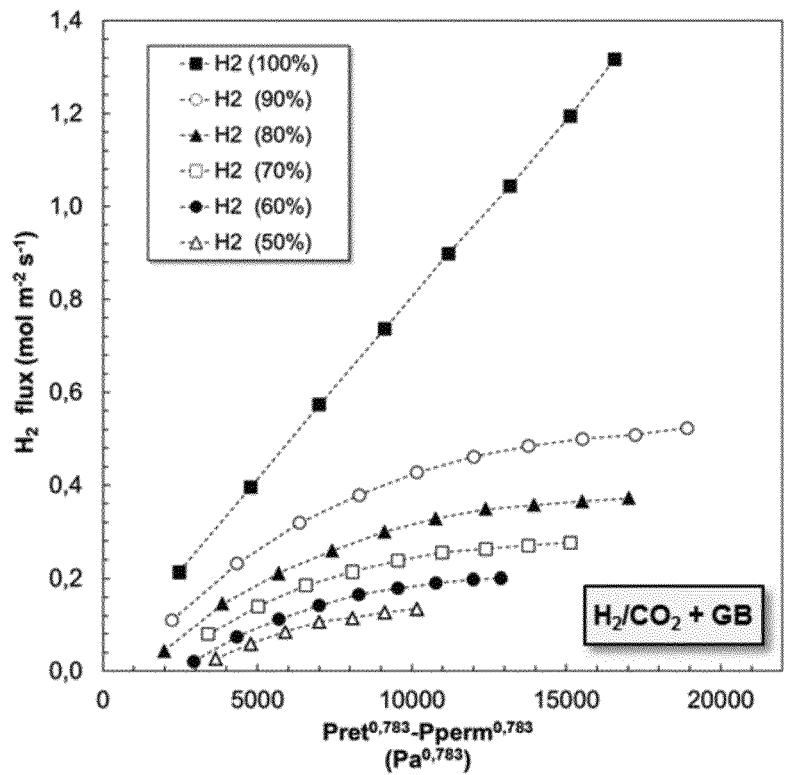
Figure 9A:
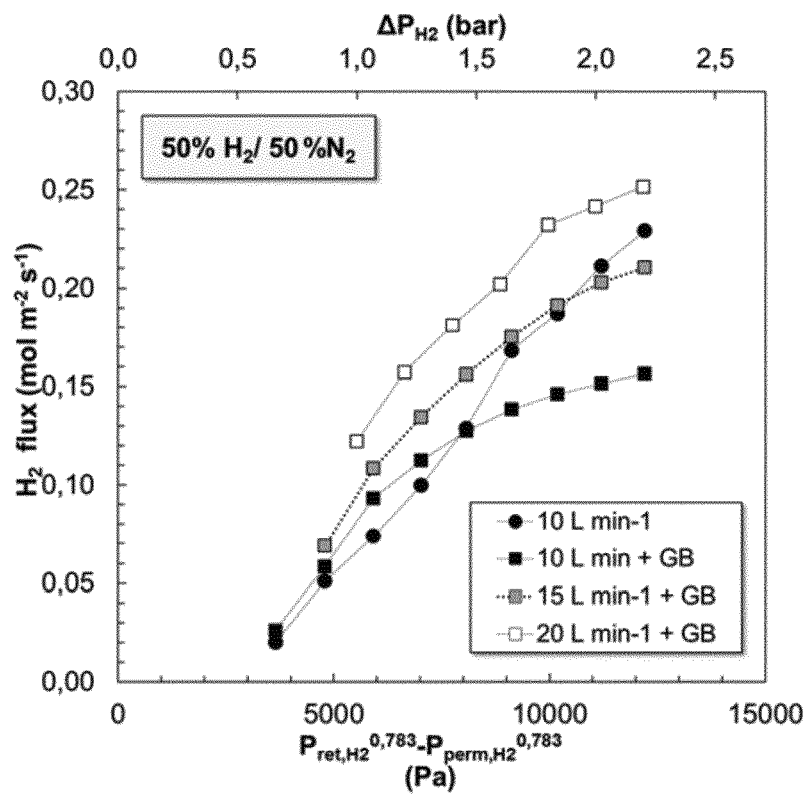
FIGS. 9A-9C show $H_2$ transmembrane flux of DS-2 at 400° C. of binary mixtures at different total flow rates in absence and presence of glass beads. (9A) $H_2$—$N_2$ mixture with 50% vol. $H_2$, (9B) $H_2$—$N_2$ mixture with 90% vol. $H_2$ and (9C) $H_2$—$CO_2$ mixture with 50% and 90% vol. $H_2$, according to embodiments of the invention.

Once glass beads were introduced into the reactor (FIG. 8B and FIG. 8D), the same binary gas mixture tests were carried out. The results show that the $H_2$ permeation flux for the case of the fluidized bed tests was slightly higher compared with the experiments in the empty tube, which demonstrates that the fluidized bed, due to particle movement, increases the gas mixing and thus reduces the extent of external mass transfer limitations (i.e. the thickness of concentration profile near the membrane surface is reduced). However, this improvement was observed only at low transmembrane pressures for each mixture. As an example, for a $H_2$—$N_2$ mixture with 50 vol. % $H_2$, the $H_2$ flux is larger in presence of glass beads, when the partial pressure of hydrogen is lower than 1.4 bar (FIG. 9A). While for a feed with 90 vol. % $H_2$, this value increased to 1.7 bar (FIG. 11B). Above these pressures, the hydrogen flux in fluidized beds is lower than the one measured in the empty tube. This could be related to the appearance of another phenomenon. At high fluxes the particles are dragged towards the membrane surface with the formation of densified zones close to the membranes that will induce an additional mass transfer resistance decreasing the flux.

Figure 9B:
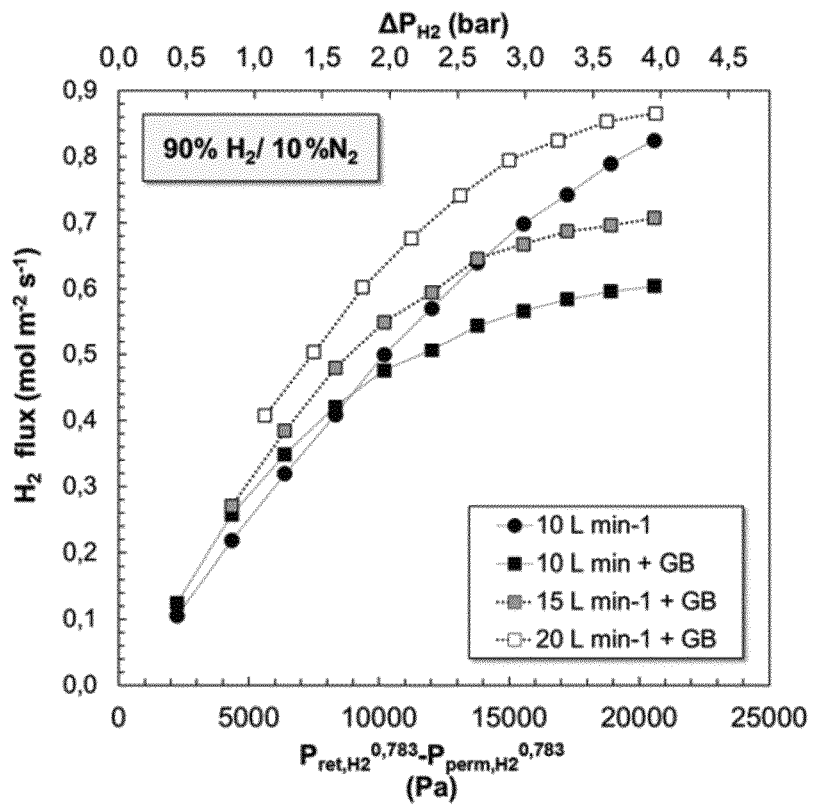
Figure 9C:
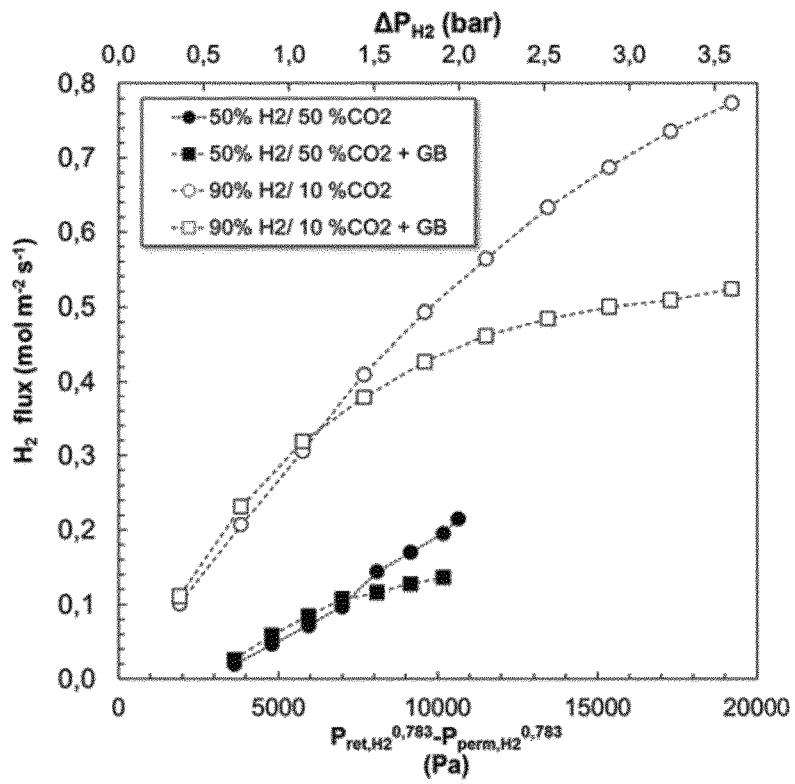

The total feed flow rate also influences the hydrogen flux as shown in FIGS. 9A-9C. In the presence of glass beads, as the total feed flow rate increases, the permeated $H_2$ flux also increases. However, the hydrogen recovery at the permeate side decreases and the membrane surface area to feed flow rate decreases, thus the effect of the membrane on the hydrogen recovery decreases. The same trend was observed for mixtures of $H_2$—$CO_2$ (see FIG. 8C).

Figure 10:
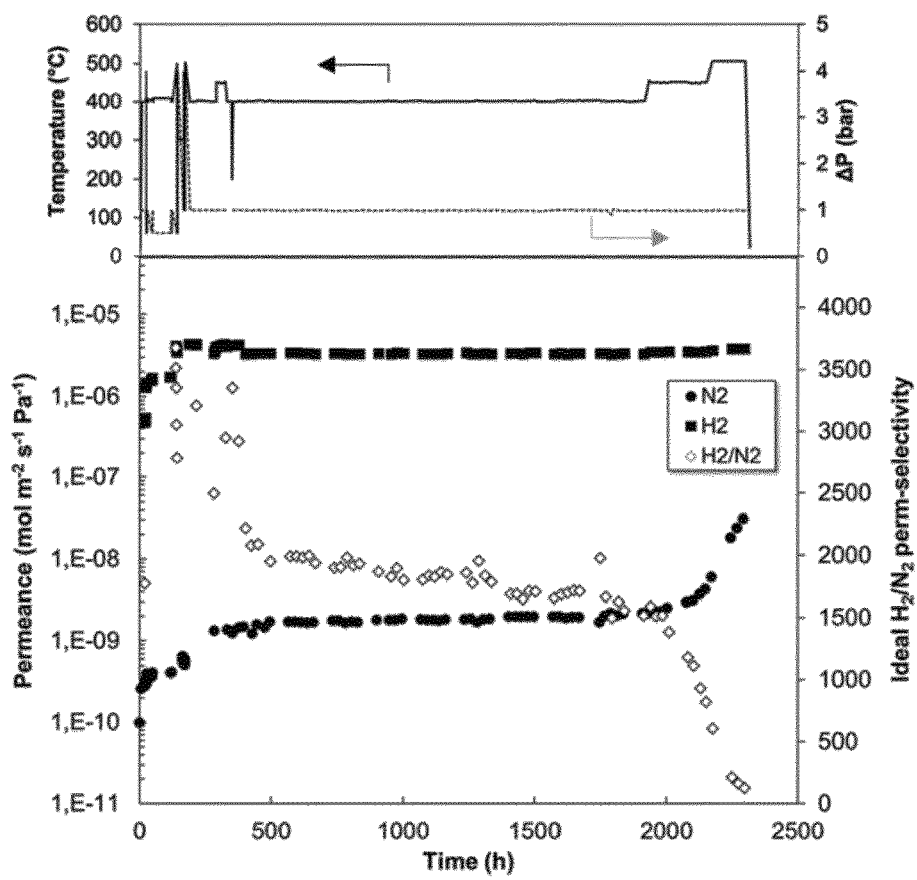
FIG. 10 shows long-term test DS-1 membrane with 4 wt. % of silver at the selective layer. Rh supported on a promoted alumina particles were introduced after 400 hours. Temperature and pressure profiles are represented above. The U/Umf was kept constant during the test (3), according to the current invention.

Turning now to Rh promoted into alumina, with ceramic supported DS-membranes. Another membrane (DS-1) with 4 wt. % of silver in the selective layer was tested under fluidization conditions for longer time with a catalyst provided by Johnson Matthey®. The catalyst consisted of modified alumina particles (100-300 μm size) loaded with 0.5 wt. % of rhodium. Unlike the glass particles, the promoted alumina supported Rh particles were non-spherical and harder. Consequently, attrition with the membrane surface is expected to be more severe anticipating a faster decrease in the selectivity in comparison the glass beads experiments. The nitrogen permeance at 400° C. was $4.15 \cdot 10^{-10}$ mol m$^{-2}$ s$^{-1}$ Pa$^{-1}$ before the integration of the membrane into the reactor and a defect on the membrane surface was already identified during the leak test of sealings. This value increased during first 350 hours (see FIGS. 8A-8C). Hydrogen and Nitrogen permeation test were carried out until the permeance was constant (350 h). During this time, single gas test and binary gas mixture tests were performed (those results are not included in this paper). At this point, the ideal perm-selectivity of the membrane at 1 bar of pressure difference was ~2800 and ~3700 at 300° C. and 500° C. respectively and the $N_2$ permeance increased till ~$1.4 \cdot 10^{-9}$ mol m$^{-2}$ s$^{-1}$ Pa$^{-1}$. Subsequently, the reactor was cooled down to 200° C. and, catalyst was introduced immersing the membrane completely. The bed was fluidized in the freely bubbling regime ($U/U_{mf}$=3) at 400° C. and 1 bar of pressure difference. The $H_2$ and $N_2$ permeation was monitored for more than 1500 hours. During this period the ideal perm-selectivity was maintained at around 2000 and the $H_2$ permeance at $3.35 \cdot 10^{-6}$ mol m$^{-2}$ s$^{-1}$ Pa$^{-1}$. Then, the temperature was increased to 450° C. and maintained for 7 days. Finally, the temperature was increased to 500° C. As can be clearly observed in FIG. 10, the nitrogen leakage starts rising dramatically when the temperature was raised to 450° C. At the end of the experiment, the nitrogen leakage was $3 \cdot 10^{-8}$ mol m$^{-2}$ s$^{-1}$ Pa$^{-1}$ at 500° C.

The membrane surface and sealing were studied in more detail at room temperature. After this long-term test, it was observed that the protective layer remained at the surface of the membrane, indicating that the abrasion of the surface was not the primary cause of the layer removal of the previous membranes. A helium leak test was carried out by immersing the membrane in ethanol and introducing 1 atm pressure of gas. Leaks were observed at both end sealings, but more extensive at the top sealing. In order to quantify the contribution of the membrane surface to the total nitrogen leakage, both sealings were covered with a gas tight resin. It was calculated that the nitrogen leakage contribution of the membrane surface was only 8% of total leakage. Thus, it can be concluded that the membrane performance has been affected after this long-term test (~2500 h) for only 8% and the main leaks were found at the sealings.

Figure 11:
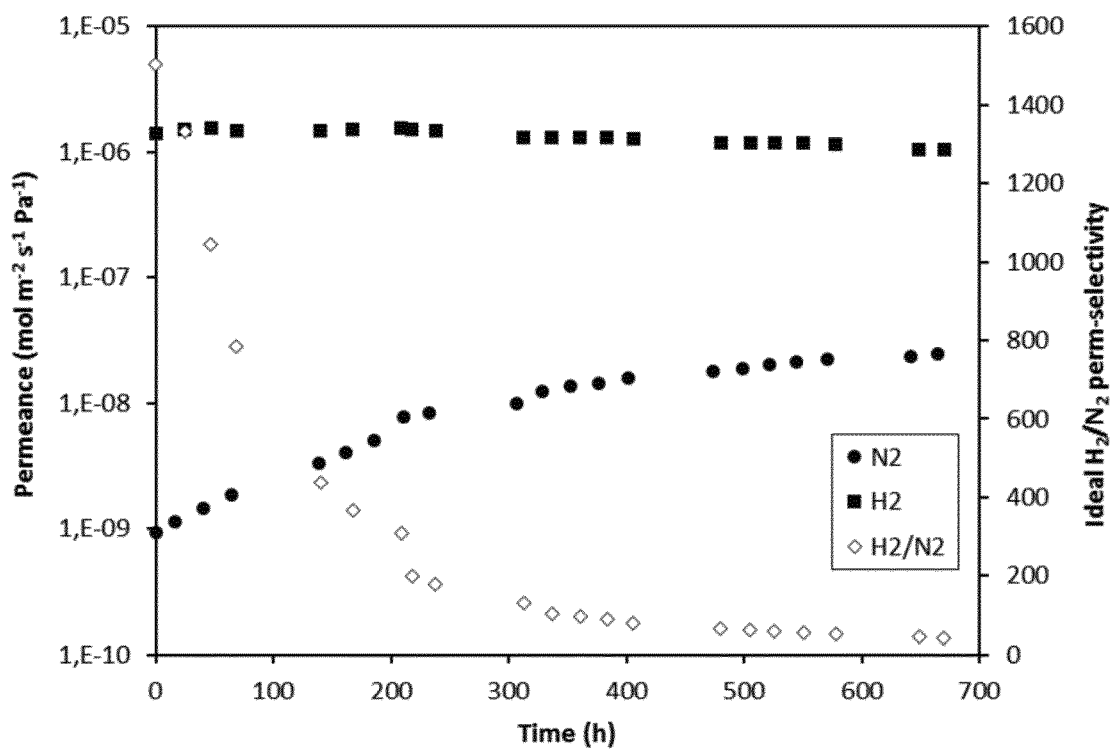
FIG. 11 shows long-term test at 550° C. of DS-3 membrane with 4 wt. % of silver at the selective layer. Rh supported on a promoted alumina particles were introduced at the beginning of the test, according to the current invention.

A third membrane (DS-3) with 4 wt. % of silver has been tested at 550° C. and 1 bar of pressure difference under fluidization conditions for ~700 hours with the same catalyst as the previous membrane DS-1 (alumina based, see FIG. 11). The hydrogen permeance of DS-3 at 550° C. is lower ($1.3 \cdot 10^{-6}$ mol m$^{-2}$ s$^{-1}$ Pa$^{-1}$) than the DS-2 at 500° C. ($3.2 \cdot 10^{-6}$ mol m$^{-2}$ s$^{-1}$ Pa$^{-1}$). This could be partly related to the thicker selective layer of DS-3 (~1.86 µm) in comparison with the DS-2 (~1 µm), but also differences in the thickness of the protective layers (~0.5 µm and ~0.67 µm for DS-2 and DS-3, respectively) could play a role.

As shown in FIGS. 9A-9C, the ideal $H_2/N_2$ perm-selectivity was not as high as for DS-2. This is not only related to the lower hydrogen permeance of DS-3, but rather to a large defect found on the surface of the membrane that contributed to the nitrogen leakage. The increase in the $N_2$ leakage was extremely fast during the first 250 hours. The experiment was stopped when the ideal perm-selectivity had decreased to almost 50. As was been done for the DS-1 membrane, the leakage contribution was quantified at room temperature by pressurizing the inner side with helium before and after covering the sealings with a gas-tight resin. For the case of DS-3 with a defect since the beginning of the test, the total contribution of the membrane to the leakage was 20%. Further studies should be done in order to improve the sealing of the supported membranes onto ceramic supports.

A conventional metallic supported membranes and double-skin (DS) membranes have been tested under fluidization conditions in order to compare their performance in a FBMR in a long-term test.

The membranes have been tested first in an empty reactor with pure gases ($H_2$ and $N_2$) at temperature range of 300-500° C. in order to get the main membranes permeation characteristics, such as the hydrogen permeance, ideal $H_2/N_2$ perm-selectivity, activation energy and n-value (summarized in Table 2). It was observed that membranes exhibit a very similar hydrogen permeance at 500° C. and 4 bar of pressure difference (1.34-1.55·10$^{-6}$ mol m$^{-2}$ s$^{-1}$ Pa$^{-1}$). The perm-selectivity of the metallic supported membranes (M33) under the same conditions was above 90000, while for the double-skinned membranes it was virtually infinite. It was found that the activation energy for both membranes is very similar and below 10 kJ mol$^{-1}$. The pressure exponent (n-value) increases from 0.62 to 0.71 after addition of the protective layer, which could be related to the effects of Knudsen diffusion and viscous flow in the porous protective layer. Since both these mechanisms show a pressure exponent of unity, the addition of porous layer can lead to an increase in the n-value, as observed in this work.

TABLE 2

Main parameters of convectional metallic supported (M33) and double-skin membrane (M15-DS) in an empty reactor

| Parameters | M33 | M15-DS |
|---|---|---|
| $H_2$ permeance (mol m$^{-2}$ s$^{-1}$ Pa$^{-1}$) | $1.34 \cdot 10^{-6}$ | $1.55 \cdot 10^{-6}$ |
| Ideal $H_2/N_2$ perm-selectivity* | 93300 | 3500000 |
| Ea (kJ mol$^{-1}$) | 7.17 | 6.26 |
| n-value | 0.61 | 0.72 |

*Measured at 500° C. and ΔP = 4 bar.

Figure 12:
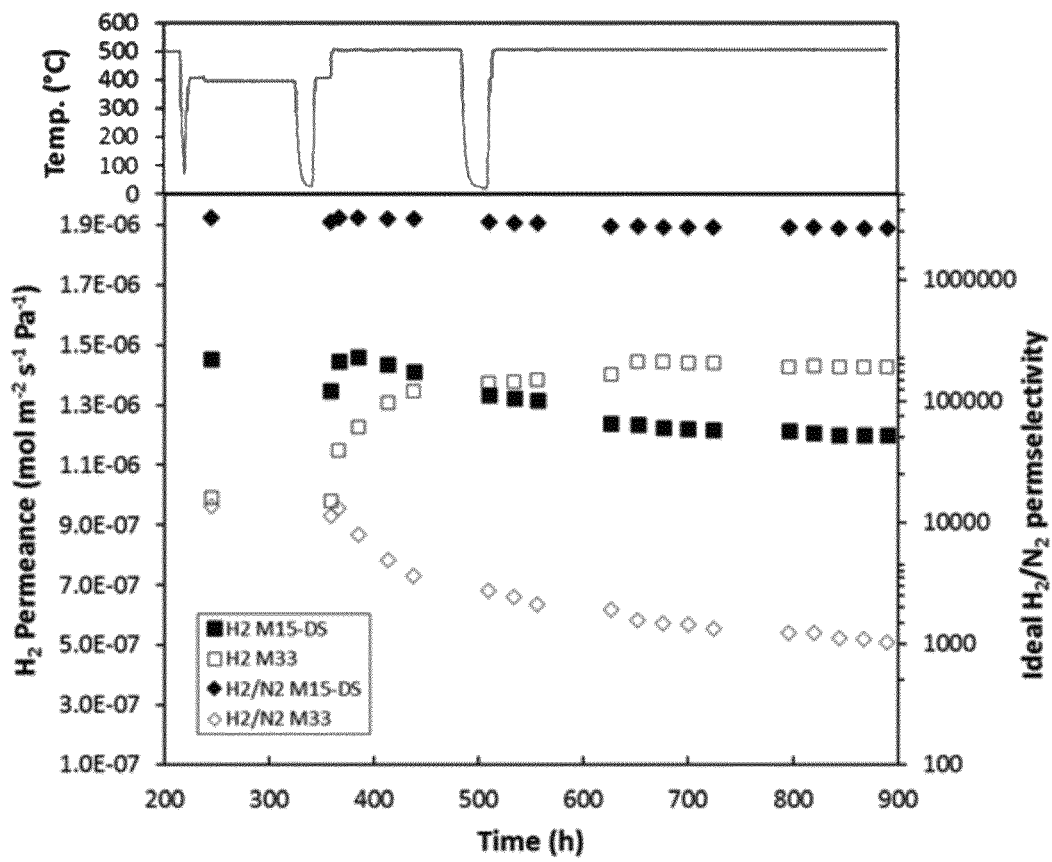
FIG. 12 shows hydrogen and ideal perm-selectivity at 4 bar of pressure difference for M33 and M15-DS in presence of Rh based catalyst under bubbling fluidization regime, according to the current invention.

Once the catalyst was integrated in the reactor, the ideal perm-selectivity of the M33 membrane decreases during the first hours to ~14000. This value decreases further until ~1000 after 615 hours when operating at 400 and 500° C., caused by an increase in the nitrogen leakage from $8.76 \cdot 10^{-11}$ to $1.4 \cdot 10^{-9}$ mol m$^{-2}$ s$^{-1}$ Pa$^{-1}$ at 4 bar of pressure difference (FIG. 12). On the other hand, the DS-membrane (M15-DS) does not show any nitrogen leakage under the same conditions, showing much better attrition resistance than the conventional metallic supported membrane. During the test in the bubbling fluidization regime, the setup was cooled down twice, but the leakage of both membranes did not increase as a result of these temperature changes (FIG. 12).

These results have demonstrated that the double-skinned membranes exhibit a much better performance under fluidization conditions. Future work will be devoted to test the performance of the double skin membranes at higher temperatures.

The addition of a porous protective layer to a metallic supported Pd-based membrane enhanced the stability of the performance of membranes under fluidization conditions, paving the way for their application in fluidized bed membrane reactors. In fact, it was observed that the membranes without protective layer suffered significantly leading to an increase in the nitrogen leakage under fluidization, while the double-skinned membranes remain stable for more than 615 hours operating at 400-500° C. and 4 bar of pressure difference.

Figure 13:
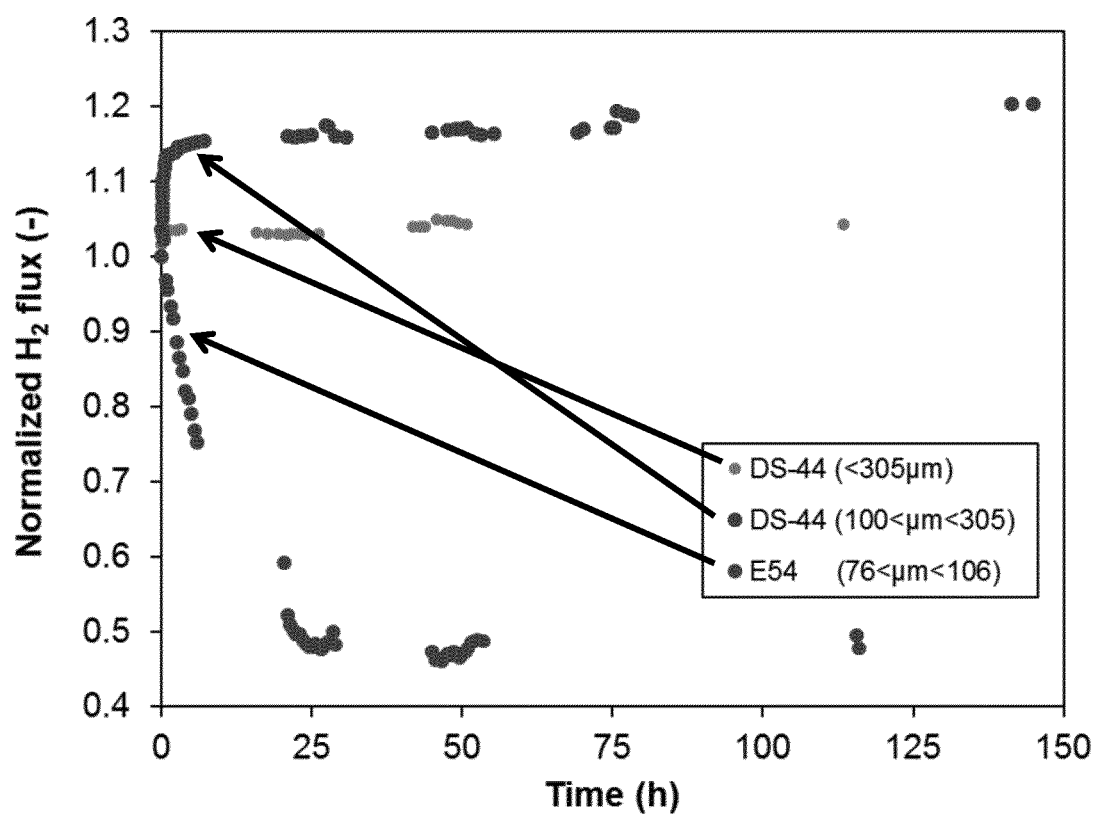
FIG. 13 shows normalized $H_2$ flux at 400° C. for a conventional PdAg membranes and two double-skin membranes. Particle size used for each test are summarized in Table 3, according to the current invention.

Regarding Titania based catalysts, it was reported that a ceramic supported conventional Pd-based membrane (E54) suffered interaction in presence of particles based on $TiO_2$. The hydrogen flux decay as particles are fluidized in the membrane reactor as it can be shown in FIG. 13. Post-morten analysis of the membrane showed presence of Ti at membrane surface, meaning that strong chemical interaction happened. The particle size used during this test was between 76 and 106 µm. Same test have been performed with a ceramic supported double-skin (DS-44) with with bigger particle size distribution (100-305 µm). The hydrogen flux does not decay during more than 140 hours (see FIG. 13). In addition, the $H_2/N_2$ perm-selectivity of DS-44 remains almost equal before and after the test in a FBMR above 10000. To know if smaller particles can interact with the membrane, fine particles (<100 μm) were integrated into the reactor. For that, the reactor was cool down to room temperature in nitrogen. The nitrogen leakage increases from $3.7 \cdot 10^{-10}$ mol m$^{-2}$ s$^{-1}$ Pa$^{-1}$ at 400° C. to $2.4 \cdot 10^{-9}$ mol m$^{-2}$ s$^{-1}$ Pa$^{-1}$ at 20° C. This increase in the N$_2$ leakage could be related to the sealing and was studied after the test with integration of the small particles. Once the reactor was heat-up to 400° C. the membrane was exposed to hydrogen. Measured hydrogen flux was larger than in the previous experiment without fine particles. Moreover, the H$_2$ flux did not decay during the test, thus no interaction between particles and membrane was observed. The description of each membrane and particle size used in each test are summarized in Table 3. As it can be observed, the hydrogen permeance measured in an empty reactor and in a FBMR at the beginning is lower for E54 and for DS-44 with particles between 100-305 μm. However, the DS-44 almost recover the initial value (in an empty reactor) after 50 hours, while the E54 continue decreasing. For the case of DS-44 with particles <305 μm the H$_2$ permeance increased a bit in the first hours in a FBMR and remained constant during more than 110 hours. The selectivity was lower than in the previous test due to the increase in the nitrogen leakage. It was found that the leakage through the sealings was around 90% of the total leakage.

TABLE 3

Main parameters of the tested membranes in a FBMR with TiO$_2$ based particles.

| Parameter | E54 | DS-44 | |
|---|---|---|---|
| Thickness selective layer (μm) | 3.6 | 0.65 ± 0.03 | |
| Thickness protective layer (μm) | — | 0.57 ± 0.04 | |
| Particle size (μm) | 76-106 | 100 < μm < 305 | <305 |
| H$_2$ permeance in an empty reactor | $2.2 \cdot 10^{-6}$ | $4.7 \cdot 10^{-6}$ | |
| H$_2$ permeance in a FBMR (t = 0 h) | $2.0 \cdot 10^{-7}$ | $3.7 \cdot 10^{-6}$ | $4.7 \cdot 10^{-6}$ |
| H$_2$ permeance in a FBMR (t = 50 h) | $9.3 \cdot 10^{-8}$ | $4.3 \cdot 10^{-6}$ | $4.9 \cdot 10^{-6}$ |
| H$_2$ flux decay (%)[a] | 95.7 | 7.3 | −5.4 |
| H$_2$/N$_2$ perm-selectivity (empty reactor/after fluidization test) | ~3000/100 | 12794/12047 | 2981/1343[b] |

[a] Taking into account the measured H$_2$ in an empty reactor and after being fluidized at 400° C. for 50 hours.
[b] The nitrogen leakage increased when the reactor was cooled down for integration of particles below 100 μm. After the test with small particles it was found that 89% of the leakage was through due to the sealings.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A hydrogen permeable membrane, comprising:
    a) a porous support layer of metal, ceramic or a metal and ceramic with pore size in the range of 2 nm to 50000 nm;
    b) a hydrogen selective Pd 95-Ag5 film at a thickness in the range of 0.5 to 150 μm disposed onto the porous support layer; and
    c) a porous protective layer of 50% YSZ—50% γ-Al$_2$O$_3$ at a thickness in the range of 0.5 to 150 μm disposed onto the hydrogen selective Pd95-Ag5 film.

2. The hydrogen permeable membrane of claim 1, wherein the porous protective layer comprises pore sizes in a range of 1 to 400 nm.

3. The hydrogen permeable membrane of claim 1, wherein the porous support layer comprises alpha-alumina.

4. The hydrogen permeable membrane of claim 1, wherein the ceramic porous support layer comprises a material selected from the group consisting of an oxide, nitride, and a carbide.

5. The hydrogen permeable membrane of claim 1, wherein the porous support layer comprises a 100 nm pore size.

6. The hydrogen permeable membrane of claim 1, wherein the hydrogen selective Pd95-Ag5 film has a thickness of 1 μm.

7. The hydrogen permeable membrane of claim 1, wherein the porous protective layer has a thickness of 0.5 μm.

8. The hydrogen permeable membrane of claim 1, wherein the porous protective layer further comprises a catalyst in the pores, wherein the catalyst is selected from the group consisting of Pt, Ni, Rh, Ru, Ag, and Pd.

9. The hydrogen permeable membrane of claim 1 further comprising a housing that encapsulates the hydrogen permeable membrane, the housing comprising a retentate end and a permeate end.

10. The hydrogen permeable membrane of claim 9, wherein the housing comprises a material selected from the group consisting of stainless steel, carbide, ceramic, and a solid solution strengthened nickel-chromium-iron-molybdenum alloy.

11. The hydrogen permeable membrane of claim 9, wherein the housing is disposed in a hydrogen production reaction vessel, wherein the produced hydrogen passes from the housing retentate end to the housing permeate end.

12. The hydrogen permeable membrane of claim 9, wherein the housing has a shape selected from the group consisting of tubular, micro-channels, planar, and parallel plates.

13. The hydrogen permeable membrane of claim 1, wherein the porous protective layer comprises pore sizes in the range of 1 to 50 nm.

14. The hydrogen permeable membrane of claim 1, wherein the porous protective layer comprises pore sizes in the range of 2 to 20 nm.

* * * * *